United States Patent Office 2,786,829

Patented Mar. 26, 1957

1

2,786,829

SULFURIZATION IN THE PRESENCE OF SULFUR DIOXIDE

Donald R. Stevens, Wilkinsburg, and Samuel C. Camp, Gibsonia, Pa., assignors to Gulf Research & Development Company, Pittsburgh, Pa., a corporation of Delaware No Drawing. Application September 12, 1952, Serial No. 309,368

8 Claims. (Cl. 260—139)

This invention relates to the sulfurization of organic compounds and more particularly to a process for sulfurizing organic compounds in the presence of sulfur dioxide.

In most cases of sulfurization of organic compounds, at least some hydrogen sulfide is evolved. We have discovered that the evolution of hydrogen sulfide usually has disadvantages which make it desirable either to eliminate entirely the production of hydrogen sulfide or to control the reaction so that only a limited desirable amount of hydrogen sulfide is present during the reaction.

The disadvantages of the production of hydrogen sulfide in a sulfurization reaction can be illustrated by the equations for the reaction between an organic compound (isobutylene) and sulfur. The general equation for the sulfurization of isobutylene is $$i\text{-}C_4H_8+5S \rightarrow C_4H_4S_3+2H_2S \qquad (1)$$

Two mols of hydrogen sulfide are formed for each five mols of sulfur employed so that only about 60 percent of the sulfur can be recovered in the sulfurized product. Since the operation is conventionally carried out in a closed system, there is a considerable tendency for the evolved hydrogen sulfide to combine with some of the unreacted isobutylene to give a mercaptan according to the equation:

$$i\text{-}C_4H_8+H_2S \rightarrow t\text{-}C_4H_9SH$$

In addition to forming the mercaptan which is generally an undesirable contaminant, the reaction consumes some of the olefins intended for conversion to $C_4H_4S_3$. Furthermore, a loss of sulfur takes place through the formation of disulfide and polysulfides according to the following reaction:

$$C_4H_9SH+S \rightarrow C_4H_9SSC_4H_9 \text{ and } C_4H_9S_xC_4H_9+H_2S$$

The foregoing equations clearly show that the disadvantages of a typical reaction between elemental sulfur and an organic compound include: the inefficient use of sulfur, the production of hydrogen sulfide which must be collected and disposed of, and the production of undesirable contaminating by-products by the side reactions of the hydrogen sulfide.

Our present invention comprises a process for sulfurizing organic compounds in which the production of hydrogen sulfide is inhibited so that the problem in conventional sulfurization processes of disposing of hydrogen sulfide is eliminated or substantially reduced, the undesirable side reactions described above are avoided, and the desired products are obtained in higher yields. In accordance with our invention in sulfurizing organic compounds, the organic compound is contacted simultaneously with sulfur and sulfur dioxide, under conditions of temperature and pressure which cause reaction between the organic compound and sulfur.

The equation for the reaction of our process in the sulfurization of isobutylene is believed to be as follows:

$$i\text{-}C_4H_8+2S+SO_2 \rightarrow C_4H_4S_3+2H_2O \qquad (2)$$

2

By comparing Equation 2 with Equation 1 given above for the sulfurization of isobutylene with sulfur alone, it can be seen that the sulfur requirement per mol of isobutylene has been reduced in our process from 5 mols to 3 mols (one as $SO_2$). There is no waste of sulfur as $H_2S$, and there is no problem of collecting and disposing of the $H_2S$.

Still another advantage of our process is that the production of hydrogen sulfide can be controlled to any desired extent by controlling the amount of sulfur dioxide employed. This characteristic of our process is important in reactions in which it may be desirable to produce a limited quantity of hydrogen sulfide. In such reactions we employ in accordance with our invention an amount of sulfur dioxide which is sufficient to inhibit the production of hydrogen sulfide but insufficient to eliminate completely the production of hydrogen sulfide. An example of such a reaction is in the vulcanization of rubber, in which the presence of some hydrogen sulfide is believed to be beneficial. With our process it is possible to have present the exact optimum amount of hydrogen sulfide during the vulcanization.

The type of materials for which our sulfurization process is applicable can generally be described as organic compounds or materials which evolve appreciable amounts of hydrogen sulfide when sulfurized. With all such materials our process of sulfurizing in the presence of sulfur dioxide results in economy of sulfur utilization and/or improved quality of products. Among the many substances that have been sulfurized with elemental sulfur and to which our improved sulfurization process could be applied are the following:

HYDROCARBONS

Methane (in the production of $CS_2$)
Mineral oils
Naphthalene
Anthracene
Diphenyl
Dihydronaphthalene
Dihydronaphthalene dimers
Dihydropolycyclic aromatic hydrocarbons
High molecular weight olefins
Solvent extracts of lubricating oil stocks
Isobutylene polymers
$C_2$, $C_3$, $C_4$, and $C_5$ polymers and cross polymers
Lubricating oils
Cycle oils (from $H_2SO_4$ extract of high sulfur petroleum fractions)
Isobutylene resins (from polymerization of isobutylene in presence of catalysts such as $AlCl_3$ or $BF_3$)
Butanes and butenes (in the production of thiophenes)
Cracked distillates
Olefins from gasoline cuts, kerosene cuts, Stoddard solvent, gas oil, wax distillates, wax, and foots oil (halogenated and then dehalogenated to produce the olefin)
Unrefined lubricating stocks
Aromatic still residues
Polymerized unsaturated hydrocarbons from cracked distillates
Terpenes, turpentine, pinene
Cuts from petroleum cracked residues
Polymers from $H_2SO_4$ sludge from cracked distillates
Polymers from clay treating cracked distillates
Solvent extracts of acid treated cracked distillates
Cracked wax

OXIDIZED HYDROCARBONS

Oxidized wax
Oxidized isobutylene polymers and co-polymers
Blown and unblown asphalts

CHLORINATED HYDROCARBONS AND OTHER COMPOUNDS

Chlorinated mercaptans
Chlorinated isobutylene polymers
Chlorinated wax
Chlorinated naphthalenes
Chlorinated olefin polymers and co-polymers
Chlorinated animal, vegetable and mineral oils
Halogenated cardanol

FATTY MATERIALS

*Vegetable oils, drying and semi-drying*

| | |
|---|---|
| Soybean | Cashew nut |
| Linseed | Palm |
| China-wood | Corn |
| Cottonseed | Pine |
| Rapeseed | Peanut |

*Animal oils*

| | |
|---|---|
| Lard | Fish |
| Sperm | Neat's-foot |
| Marine | |

*Unsaturated glycerides*

Mono and dihydric esters from fatty oil acids from rapeseed, arachis, cottonseed, maize, ravision, sunflower seed and soybean oils
Mixture of lanolin and sperm oil
Phosphatides
Mono and dihydric esters of linoleic acid
Unsaturated fatty alcohols (such as oleyl)
Pine wood acids esterified with mono and dihydric alcohols

MISCELLANEOUS

Terpineols
Polymerized pine oil
Tertiary alcohols from terpenes
Rosin
Tall oil and tall oil esters
Tall oil plus tricreysl phosphate
Hydrogenated abietic acid and esters
Sulfur-containing hydrocarbons
Diphenyl oxide
Asphaltum bases, such as vegetable, coal tar and petroleum distillation residues
Sodium mercaptides
Cardanol and cardanol esters
Acidified mineral oil
Oleic acid
Naphthenic acids, esters and amides
Cumarone-indene resins
Methyl oleate, ethyl abietate
Diarylamines
Tricresyl phosphate
Semi-drying oils partially polymerized with sulfur
Mercaptans and mercaptides
Reaction product of amines and carbon disulfide
Aldehyde amine reaction products
Acid amides
Lubricating oil plus lead soaps
Lubricating oil plus calcium phenylstearate
Amines, aromatic or aliphatic
Alcohols
Glycol ethers and polyglycols
Rubber (vulcanization)

Our process of sulfurizing organic compounds in the presence of sulfur dioxide does not exclude the possibility that sulfurizing agents other than elemental sulfur might also be present. In general, any sulfurization reaction evolving hydrogen sulfide can be better performed according to our process. Thus, the sulfurization of aliphatic nitriles with a mixture of sulfur and sulfur chlorides could be performed according to our process by adding sulfur dioxide to the reaction mixture. Our process can also include reacting sulfur and phosphorus sulfides ($P_2S_5$, $P_2S_3$, $P_4S_7$, and $P_4S_3$) in the presence of sulfur dioxide with substances such as the following: lard oil, cottonseed oil, castor oil, linseed oil, cracked wax, chlorinated esters or ketones, long-chain olefins, alcohols, phenols, esters, ketones, terpenes, polymers, etc.

Our process can also include sulfurizing with sulfur and $Na_2S_x$ or sulfur and phosphorus sulfides in the presence of sulfur dioxide substances such as the following:

Halogenated wax
Halogenated petrolatum
Halogenated kerosene
Halogenated gas oil
Halogenated lubricating oil
Higher alcohols (octadecyl)
High aldehydes (lauraldehyde)
Higher ketones (diisobutyl)
Higher acid esters (ethyl stearate, isopropyl ester of oxidized wax acids)
Higher acids (stearic, oxidized wax acids)
Dehydrated unsaturated alcohols from:
- Sperm oil
- Beef tallow
- Lard, cottonseed, olive, corn, rapeseed, menhaden, soybean, linseed and China-wood oils
- Oleyl alcohol
- Abietyl alcohol, and also
- Cetene, abietene, dicyclohexyl, dihydronaphthalene, menthene, dipentene, terpentine and terpinolane Our process can also apply to the sulfurization of organic compounds with sodium polysulfides ($Na_2S_x$) where such reactions evolve hydrogen sulfide. An example of such a reaction is the sulfurization of alkyl phenols with $Na_2S_x$ in the presence of sulfur dioxide.

In most cases, the proper amount of sulfur dioxide to employ in the reaction of my process is the amount which will react with substantially all of the hydrogen sulfide formed in the reaction. In certain reactions, of course, there is no disadvantage to the formation of a controlled amount of hydrogen sulfide and in such cases the concentration of sulfur dioxide can be somewhat lower than usual. An excess of sulfur dioxide over the amount required to react with the hydrogen sulfide is usually not objectionable. In the case of an olefin sulfurization as seen in Equation 2, the proper proportions to eliminate substantially completely the production of hydrogen sulfide are, two mols of sulfur and one mol of sulfur dioxide per mol of olefin.

The following examples describe sulfurizations of various organic substances carried out in the absence of sulfur dioxide and sulfurizations performed according to our process. The examples illustrate the superiority of our process.

EXAMPLE I

A. The sulfurization of paraffin wax in the presence of sulfur dioxide was carried out by charging 395.0 grams of 122° F. melting point wax (1.05 mols assuming the wax to be $C_{27}H_{56}$), 64.0 grams of elemental sulfur (2 mols), and 66.0 grams of sulfur dioxide (1.02 mols) to a lead-lined autoclave of 1,830 milliliters capacity provided with a stirrer, a thermowell, and a pressure gauge. The temperature was raised to 205° C. in a period of 74 minutes and the autoclave was held at 205° to 220° C. for two hours. The pressure was 142 pounds per square inch gauge at the start of this period and 136 pounds per square inch gauge at the end. The contents of the autoclave were cooled and a solid product having two layers was obtained which was warmed and then separated by decantation. The upper layer of 398.0 grams was a homogeneous light tan, semi-hard solid, soluble in xylene, giving a clear solution. The lower layer, 64.4 grams, was unreacted sulfur and sulfurized product. The lower layer was extracted with xylene to obtain 40.3 grams of unreacted sulfur and 24.1 grams of sulfurized product. The total yield of sulfurized product was, therefore, 422.0 grams having a sulfur content of 3.7 percent. It was calculated that the product contained 15.6 grams of combined sulfur which was 16.1 percent of the sulfur charged.

B. The sulfurization of paraffin wax with sulfur alone was carried out by charging 395.0 grams of 122° F. melting point wax (1.05 mols assuming the wax to be $C_{27}H_{56}$) and 160.0 grams of sulfur (5 mols) to the lead-lined autoclave. The temperature was brought up to 205° C. and the pressure to 10 pounds per square inch gauge over a period of 52 minutes. The autoclave and its contents were held at 205° to 220° C. for two hours, at the end of which period the pressure was 20 pounds per square inch gauge. Thereafter the product was cooled and was found to consist of two layers which were warmed and then separated by decantation. The upper layer of 348.0 grams was light tan in color and cooled to a semi-hard homogeneous mass which was soluble in xylene, giving a clear solution. The lower layer of 166.3 grams was a mixture of sulfurization product and unreacted sulfur. This lower layer was extracted with xylene to obtain 118.8 grams of unreacted sulfur and 47.5 grams of the product. The total yield of sulfurization product therefore was 395.5 grams. This product analyzed 3.0 percent sulfur. From this value it was calculated that the product contained 11.9 grams of combined sulfur which was 7.4 percent of the sulfur charged.

By comparing the results of Process A carried out in the manner of our invention with those of Process B in Example I, it can be seen that our process gives a higher yield of sulfurized product and causes a higher percentage of the sulfur to react than does the sulfurization with sulfur alone.

EXAMPLE II

A. The sulfurization of isobutylene in the presence of $SO_2$ was carried out by charging 192 grams of sulfur (6 mols), 170 grams of isobutylene (3.04 mols) and 213 grams of sulfur dioxide (3.3 mols) to a stainless steel bomb of 1600 ml. capacity. While rotating the bomb, the temperature of the bomb and its contents were brought up to 180° C. in one hour and held at 180° to 195° C. for 120 minutes. The maximum pressure of 1180 p. s. i. g. was attained when the temperature reached 176° C. and the pressure fell steadily thereafter during the reaction. At the end of 60 minutes of the 120 minute reaction time, the pressure was 340 p. s. i. g. at 180° C. The bomb and contents were cooled with an air blast. On opening the bomb, there was recovered 436 grams of a dark colored organic liquid and 131 grams of an aqueous layer. Fractionation of 392 grams of the organic liquid at 1 mm. Hg pressure gave 168.4 grams of $C_4H_4S_3$ (1.13 mols). This was equivalent to 186.3 grams of $C_4H_4S_3$ (1.26 mols) from the total 436 grams of product. Thus the process yielded 0.136 mol of $C_4H_4S_3$ per mol of sulfur used (including the sulfur of the $SO_2$). The crude $C_4H_4S_3$ thus obtained was found to have melting point range of from 37° to 38.3° C. This compares with the melting point of the pure $C_4H_4S_3$ of from 39° to 40° C. A portion of the pure compound was mixed with the crude compound obtained in this example for a mixed melting point test and it was found that the melting point was not substantially changed. The presence of the $C_4H_4S_3$ molecule was also established by ultra violet light spectroscopy. The residue weighed 194.3 grams, or 215.5 grams for the total of 436 grams of product.

B. The sulfurization of isobutylene with sulfur alone was carried out by charging 160 grams of elemental sulfur (5 mols) and 234 grams of isobutylene (4.18 mols) to the stainless steel bomb of Process A above. While rotating the bomb, the temperature of the bomb and its contents was brought up to 180° C. over a period of one hour and was held at 180° to 190° C. for 210 minutes. A maximum pressure of 630 p. s. i. g. was attained when the temperature reached 176° C. The pressure rapidly decreased thereafter and was about 170 p. s. i. g. at the end of the experiment. The bomb and its contents were cooled with an air blast. On opening the bomb, a dark colored liquid product was recovered. Fractionation of the product at 1 to 2 mm. Hg pressure produced 62.8 grams of $C_4H_4S_3$ (0.425 mol) at 118° to 122° C. This represents a yield of 0.085 mol of $C_4H_4S_3$ for each mol of sulfur charged. The distillation residue was 49.0 grams. A considerable amount of material, 190.2 grams of sulfides and polysulfides, distilled over before the $C_4H_4S_3$.

Example II shows very clearly the more efficient use of sulfur in our process. Thus our process (Process A) produced 0.136 mol of $C_4H_4S_3$ per mol of sulfur as compared with 0.085 mol of $C_4H_4S_3$ per mol of sulfur for Process B in which no $SO_2$ was used. Also for our process the product boiling at a temperature higher than the $C_4H_4S_3$ was much greater than that obtained when no $SO_2$ was used. This heavy liquid residue for our process analyzed 50.4 percent sulfur and is useful as a cutting oil base.

EXAMPLE III

A. The sulfurization of diisobutylene with sulfur and sulfur dioxide was carried out by charging 64 grams of sulfur (2 mols) and 100 grams of $SO_2$ (1.56 mols) to the autoclave described in Example I. The autoclave and its contents were brought up to a temperature of 102° C. and a pressure of 200 p. s. i. g. and then 118 grams of diisobutylene (1.05 mols) were pumped into the autoclave over a period of 36 minutes at the end of which period the pressure was 264 p. s. i. g. and the temperature 176° C. The pressure reached a maximum of 275 p. s. i. g. nine minutes later at 183° C. An additional fifteen minutes was required to get the temperature to 200° C. The temperature was held at 200° to 210° C. for 80 minutes, at the end of which period the pressure was 155 p. s. i. g. The autoclave was cooled and the product was taken up in one liter of diethyl ether. On filtering, 2.45 grams of unreacted sulfur was collected. The filtrate was mixed with an equal volume of pentane and cooled to −7° C. and crystallization occurred. The product was filtered again and 141.1 grams of crude $C_8H_{12}S_3$ (0.692 mol) was collected. This represents a yield of 0.195 mol of $C_8H_{12}S_3$ per mol of sulfur charged, including the sulfur of the sulfur dioxide.

B. The sulfurization of diisobutylene with sulfur alone was carried out by charging 160 grams of sulfur (5 mols) to the autoclave of Process A. The autoclave and its contents were brought up to a temperature of 218° C. and then 118 grams of diisobutylene (1.05 mols) was pumped into the autoclave over a period of 28 minutes. The temperature dropped to 208° C. and the pressure was 148 p. s. i. g. The temperature was maintained at 200° to 210° C. for 240 minutes. The pressure remained at about 175 p. s. i. g. throughout the reaction period. At the end of the period, the pressure was 178 p. s. i. g. and the temperature 204° C. At the end of the period the contents of the autoclave were cooled and a dark colored liquid product was taken up in one liter of diethyl ether. On filtering, 37.2 grams of unreacted sulfur was collected. The filtrate was mixed with an equal volume of pentane and cooled to −70° C. at which point crystallization occurred. There was collected 93.5 grams of crude $C_8H_{12}S_3$ (0.457 mol). This represents 0.091 mol of $C_8H_{12}S_3$ per mol of sulfur charged.

C. The sulfurization of diisobutylene with sulfur alone, releasing $H_2S$ during the reaction, was carried out by charging 160 grams of elemental sulfur (5 mols) to the autoclave of Process A and the temperature was brought to 222° C. 118 grams of diisobutylene (1.05 mols) was pumped into the autoclave over a period of 34 minutes, at the end of which period the temperature had dropped to 210° C. The temperature was held at 200° C. to 210° C. for 240 minutes and the pressure was held at 60 p. s. i. g. throughout the reaction period by a controlled release of hydrogen sulfide from the autoclave. At the end of the reaction period the autoclave was cooled and the product was taken up in one liter of diethyl ether and filtered. 8.4 grams of unreacted sulfur was collected. The filtrate was mixed with an equal volume of pentane and cooled to a temperature of −70° C. Crystallization occurred and 163.5 grams of crude $C_8H_{12}S_3$ was collected (0.8 mol). This represents 0.16 mol of $C_8H_{12}S_3$ per mol of sulfur charged.

A comparison of our process for sulfurizing diisobutylene with Processes B and C in Example III shows the considerable improvement in sulfur economy afforded by our process. Thus our process yielded 0.195 mol of $C_8H_{12}S_3$ per mol of sulfur charged as compared with 0.16 and 0.091 mols of $C_8H_{12}S_3$ per mol of sulfur charged for Processes C and B, respectively.

EXAMPLE IV

A. The sulfurization of triisobutylene in the presence of sulfur dioxide was carried out by charging 177 grams of triisobutylene (1.05 mols), 64 grams of sulfur (2 mols) and 52 grams of sulfur dioxide (0.8 mol) to the autoclave described in Example I. The autoclave and its contents were brought up to a temperature of 200° C. and a pressure of 146 p. s. i. g. over a period of 42 minutes. The temperature was held at 210° to 220° C. for 120 minutes. The final pressure was 61 p. s. i. g. at 211° C. On cooling, the final pressure was zero p. s. i. g. The essentially liquid product of 248 grams was dissolved in one liter of diethyl ether. The solution was filtered and 27.5 grams of material containing substantially unreacted sulfur was collected. The filtrate was mixed with an equal volume of pentane and cooled to a temperature of −70° C. but the only crystalline material formed was 6.2 grams of sulfur. The pentane and ether were evaporated and a reddish-brown viscous liquid was collected which analyzed 38.9 percent sulfur (theoretical sulfur content for $C_{12}H_{20}S_3$=36.9 per cent). Thus, the 214.3 grams of product contained 83.36 grams of sulfur (2.61 mols), which is 93.2 percent of the 2.8 mols of sulfur charged, including the sulfur of the sulfur dioxide. Compounds of the general formula $C_nH_{2n-4}S_3$ were identified in the product by ultraviolet light spectral analysis.

B. The sulfurization of triisobutylene with sulfur alone was carried out by refluxing triisobutylene in the presence of sulfur at atmospheric pressure using an olefin-sulfur ratio of 1:3. In the reaction we employed 2,643 grams of triisobutylene (15.7 mols) and 1,510 grams of sulfur (47.2 mols). The reaction was begun at 165° C. and was continued for 63 hours, during which period the following time-temperature data were recorded:

| Time (hrs.): | Reaction temperature (° C.) |
|---|---|
| 0 | [1] 165 |
| 8 | 176 |
| 16 | 179 |
| 24 | 182 |
| 32 | 186 |
| 40 | 191 |
| 48 | 200 |
| 54 | 208 |
| 63 | [2] 208 |

[1] Reaction assumed to start at this temperature.
[2] Reaction stopped.

The product when filtered yielded 3,413 grams of dark-colored organic liquid and 1.6 grams of a black solid which was largely unreacted sulfur. There was no crystal formation on cooling the liquid product. The liquid was washed with two 50 milliliter portions of 10 percent $Na_2CO_3$ and then washed with water until the washings were neutral. The product was dried by filtering through filter paper. It weighed 3,305 grams and analyzed 24.94 percent sulfur. The product thus calculates to contain 826 grams of sulfur (25.8 mols) or 54.7 percent of the 47.2 mols of sulfur charged.

C. The sulfurization of triisobutylene with sulfur alone was carried out by refluxing triisobutylene in the presence of sulfur at atmospheric pressure using a triisobutylene-sulfur ratio of 1:5. We used 2,270 grams of triisobutylene (13.5 mols) and 2,160 grams of sulfur (67.5 mols). The reaction period was 46 hours. During the reaction the following time-temperature data were recorded:

| Time (hrs.): | Reaction temperature (° C.) |
|---|---|
| 0 | [1] 161 |
| 8 | 178 |
| 16 | 182 |
| 24 | 186 |
| 32 | 192 |
| 40 | 206 |
| 44 | 220 |
| 46 | [2] 227 |

[1] Reaction assumed to start at this temperature.
[2] Reaction stopped.

The product when filtered yielded 2.0 grams of unreacted sulfur and 3,533 grams of oil. No crystalline material was found. The liquid product was washed with two 50 milliliter portions of 10 percent $Na_2CO_3$ and then water washed until the washings were neutral. During this period, sulfur precipitated out and a total of 52.4 grams of sulfur was collected. The final liquid, dried by filtering through filter paper, weighed 3,247 grams and contained 37.76 percent sulfur. The product calculates to contain 1,250 grams or 39.06 mols of sulfur, which is 57.8 percent of the 67.5 mols of sulfur charged.

From Example IV it is seen that our Process A yielded a product which contained 93.2 percent of the sulfur charged as compared with only 54.7 percent of the sulfur charged and 57.8 percent of the sulfur charged in the product of Processes B and C, respectively.

EXAMPLE V

A. The sulfurization of alpha-methylstyrene with sulfur and sulfur dioxide was carried out by charging to the lead-lined autoclave 70.5 grams of sulfur (2.2 mols) and 70.0 grams of sulfur dioxide (1.1 mols). The autoclave temperature was brought up to 210° F. and over a period of 21 minutes 124.0 grams of alpha-methylstyrene (1.05 mols) was pumped into the autoclave. During this period the temperature remained at 210° F. and a maximum pressure of 166 pounds per square inch gauge was developed. The autoclave and its contents were held at 200° to 205° C. for two hours and then cooled. Upon opening the autoclave there was obtained a black moist solid product which weighed 212.0 grams. This product was dissolved in ether and filtered. Insoluble material amounted to 83.0 grams. To the ether solution, containing 129.0 grams of crude product, was added pentane, whereupon 23.1 grams of crude $C_9H_6S_3$ precipitated. The solution remaining was fractionated and 4.6 grams of crude $C_9H_6S_3$ was recovered. The ether solubles were treated with chloroform and filtered giving 73 grams of chloroform-soluble material. Pentane was added to the chloroform solution and 66.4 grams of crude $C_9H_6S_3$ precipitated. Thus, a total amount of 94.1 grams of crude $C_9H_6S_3$ was recovered. Since 3.3 mols of sulfur was charged to the autoclave (2.2 mols of elemental sulfur and 1.1 mols of sulfur in the sulfur dioxide) the yield of $C_9H_6S_3$ is seen to be 94.1/3.3 or 28.5 grams $C_9H_6S_3$ per mol of sulfur.

B. The sulfurization of alpha-methylstyrene with sulfur alone was carried out by pumping 124 grams of alpha-methylstyrene (1.05 mols) into a heated autoclave containing 160 grams of elemental sulfur (5 mols) over a period of 32 minutes. The temperature was 217° C. at the beginning and end of this period and the pressure was 52 p. s. i. g. at the end of the period. The temperature was held at 205° to 215° C. for two hours. During this time, the maximum pressure was 62 p. s. i. g. On cooling and after release of hydrogen sulfide from the autoclave, there was collected 253 grams of a moist red-brown crystalline product. The product was dissolved in chloroform and filtered and 75.3 grams of unreacted sulfur was recovered. The filtrate was fractionated and 120.5 grams of crude $C_9H_6S_3$ was recovered. Since 5 mols of elemental sulfur were used in the reaction, the yield of $C_9H_6S_3$ amounted to 24.1 grams per mol of sulfur.

The results of Example V show that our Process A produced 28.5 grams of $C_9H_6S_3$ per mol of sulfur charged in the sulfurization of alpha-methylstyrene, as compared with only 24.1 grams of $C_9H_6S_3$ per mol of sulfur charged for Process B.

EXAMPLE VI

The sulfurization of turpentine with sulfur and sulfur dioxide was carried out by charging 64 grams of sulfur (2.0 mols), 80 grams of sulfur dioxide (1.25 mols) and 168 grams of turpentine (1.24 mols calculated as $C_{10}H_{16}$) to the lead-lined autoclave previously described. The autoclave was heated while stirring the reaction mixture and it required 85 minutes to bring the temperature to 197° C. at which time the pressure had risen to 164 p. s. i. g. The temperature was held between 200° and 220° C. for 120 minutes, at the end of which time the pressure was 220 p. s. i. g. After cooling the autoclave and releasing the pressure, 218 grams of dark liquid product was recovered. Of this product, 108.5 grams or 49.8 percent was soluble in ether, and 96.7 grams or 44.4 percent was soluble in chloroform. The insoluble material, sulfur and lead sulfide weighed 12.5 grams. The solvents were evaporated from each extract. The ether solubles analyzed 25.4 percent sulfur and the chloroform solubles 34.4 percent sulfur. The average was therefore 29.6 percent sulfur. The calculated amount of sulfur in the product was 60.8 grams or 58.5 percent of the sulfur charged, including that in the sulfur dioxide. Some crystalline material obtained by prolonged chilling of the ether extract at −5° C. was shown by its ultraviolet absorption spectrum to contain the cyclic dithiathione structure (for alpha pinene, $C_{10}H_{12}S_3$).

EXAMPLE VII

The sulfurization of cracked gasoline with sulfur and sulfur dioxide was carried out by charging 64.0 grams of sulfur (2.0 mols) and 102.0 grams of sulfur dioxide (1.6 mols) to the lead-lined autoclave. Heat was applied and when the temperature had reached 210° C., 146 grams of Venezuela cracked naphtha (topped to 130° F.; 1.05 mols based on assumed average composition of $C_{10}H_{20}$) was pumped to the autoclave over a period of 28 minutes. The autoclave and its contents were held at 210° C. to 220° C. for two hours. The maximum pressure was 290 p. s. i. g. and the final pressure was 246 p. s. i. g. On cooling, the product consisted of 44.1 grams (13.9 percent of the charge) of a dark-colored liquid having a sulfur content of 3.68 percent and 186 grams (59.6 percent of the charge) of a moist resinous solid having a sulfur content of 49.8 percent. When cracked gasoline is sulfurized with sulfur alone, only a liquid product is obtained.

EXAMPLE VIII

A. The sulfurization of p-nonylphenol with sulfur and sulfur dioxide was carried out by charging 32.0 grams of sulfur (1.0 mol), 90 grams of sulfur dioxide (1.4 mols), and 440 grams of p-nonylphenol (2.0 mols) to the lead-lined autoclave. The temperature was brought to 210° C. in 65 minutes, at the end of which time the pressure was 330 p. s. i. g. The temperature was held at 200° to 220° C. for two hours, at the end of which period the pressure was 345 p. s. i. g. The autoclave was cooled and opened, and there were recovered 525 grams of a dark-colored thick liquid and 20 grams of water. The organic portion was taken up in ether, filtered, and the solvent evaporated. The product analyzed 9.49 percent sulfur. By calculation the product therefore contained 49.88 grams of combined sulfur or 1.56 mols. Thus, 65.0 percent of the sulfur charged, including that as sulfur dioxide, was utilized.

B. The sulfurization of p-nonylphenol with sulfur alone was carried out by refluxing 110 grams of p-nonylphenol (0.5 mol) and 32 grams of sulfur (1.0 mol) at 220° to 240° C. for eight hours with nitrogen being passed through the system to sweep out hydrogen sulfide. On cooling the reaction mixture there was obtained 104.7 grams of product which was taken up in ether and filtered, leaving 6.8 grams of unreacted sulfur. The ether was removed from the filtrate to give 97.9 grams of a black viscous product which analyzed 6.92 percent sulfur. Thus the product contained 6.78 grams of sulfur or 21.2 percent of the sulfur charged.

A comparison of the results of Processes A and B of Example VIII shows that our process (Process A) yielded a product of which the combined sulfur was 65.0 percent of the sulfur charged whereas in Process B only 21.2 percent of the sulfur charged was utilized.

EXAMPLE IX

The sulfurization of sperm oil with sulfur and sulfur dioxide was carried out by charging 300 grams of sperm oil, 30 grams of sulfur (1 mol), and 48 grams of $SO_2$ (3/4 mol) to the lead-lined autoclave and over a period of 45 minutes bringing the temperature of the autoclave and its contents to 195° C. and the pressure to 132 p. s. i. g. The temperature was held at 180° to 195° C. for 90 minutes. The final pressure was 115 p. s. i. g. The reaction mixture was cooled and the product obtained was a thick, dark-colored oil weighing 342.8 grams. This product analyzed 9.94 percent sulfur and thus contained 34.1 grams of sulfur, so that, clearly, some of this sulfur came from the sulfur dioxide. There was no unreacted sulfur. The product had the following characteristics:

| | |
|---|---|
| Saponification No | 159.0 |
| Neutralization No | 1.3 |
| Viscosity at 100° F ____ S. U. S. | 1272 |
| Viscosity index | 129.0 |

Generally it is preferred to carry out the process at temperatures between about 160° and 230° C. for most substances. The rate of reaction can also in many reactions be increased by the use of a catalyst. Suitable catalysts include fuller's earth, $AlCl_3$, $Fe_2O_3$, etc. alone or deposited on carriers such as bauxite, silica gel, pumice, etc.

The specific examples have described the process in batch operations. It should be understood, however, that the invention includes the practice of the process in any continuous operation to which it can be adapted.

Obviously many modifications and variations of the invention as hereinbefore set forth may be made without departing from the spirit and scope thereof and therefore only such limitations should be imposed as are indicated in the appended claims.

We claim:

1. A method of sulfurizing an organic compound which forms hydrogen sulfide when reacted with sulfur which comprises contacting said compound simultaneously with elemental sulfur and sulfur dioxide in the absence of added hydrogen sulfide at a temperature and pressure which cause reaction between the organic compound and sulfur, the amount of said sulfur dioxide being sufficient substantially to eliminate the production of hydrogen sulfide.

2. A method of sulfurizing an organic compound which forms hydrogen sulfide when reacted with sulfur which comprises contacting said compound simultaneously with elemental sulfur and sulfur dioxide in the absence of added hydrogen sulfide at a temperature and pressure which cause reaction between the organic compound and sulfur, the amount of said sulfur dioxide being sufficient to inhibit the production of hydrogen sulfide but insufficient to eliminate completely such production.

3. A method of sulfurizing an olefin which forms hydrogen sulfide when reacted with sulfur which comprises contacting said olefin simultaneously with about two mols of sulfur and one mol of sulfur dioxide per mol of olefin in the absence of added hydrogen sulfide at a temperature above about 160° C.

4. A method of sulfurizing paraffin wax which comprises contacting said wax simultaneously with about two mols of sulfur and about one mol of sulfur dioxide per mol of wax in the absence of added hydrogen sulfide at a temperature between about 160° and 230° C.

5. A method of sulfurizing isobutylene which comprises contacting said isobutylene simultaneously with about two mols of sulfur and about one mol of sulfur dioxide per mol of isobutylene in the absence of added hydrogen sulfide at a temperature between about 160° and 230° C.

6. A method of sulfurizing diisobutylene which comprises contacting said diisobutylene simultaneously with about two mols of sulfur and about one mol of sulfur dioxide per mol of diisobutylene in the absence of added hydrogen sulfide at a temperature between about 160° and 230° C.

7. A method of sulfurizing alpha-methylstyrene which comprises contacting said alpha-methylstyrene simultaneously with about two mols of sulfur and about one mol of sulfur dioxide per mol of alpha-methylstyrene in the absence of added hydrogen sulfide at a temperature between about 160° and 230° C.

8. A method of sulfurizing turpentine which comprises contacting said turpentine simultaneously with about two mols of sulfur and about one mol of sulfur dioxide per mol of turpentine in the absence of added hydrogen sulfide at a temperature between about 160° and 230° C.

References Cited in the file of this patent

UNITED STATES PATENTS

| | | |
|---|---|---|
| 2,279,711 | Luten | Apr. 14, 1942 |
| 2,402,456 | Signiago | June 18, 1946 |
| 2,411,236 | Thacker | Nov. 19, 1946 |
| 2,496,508 | Watson et al. | Feb. 7, 1950 |
| 2,498,201 | Daigle | Feb. 21, 1950 |
| 2,577,636 | Sperry | Dec. 4, 1951 |
| 2,637,722 | Frazier | May 5, 1953 |